(12) United States Patent
Wood (10) Patent No.: US 8,128,257 B2
(45) Date of Patent: Mar. 6, 2012

(54) CURVED COMPACT COLLIMATING REFLECTORS

(75) Inventor: Robert L. Wood, Cary, NC (US)

(73) Assignee: Bright View Technologies Corporation, Richmond, VA (US)

( * ) Notice: Subject to any disclaimer, the term of this patent is extended or adjusted under 35 U.S.C. 154(b) by 1000 days.

(21) Appl. No.: 12/028,563

(22) Filed: Feb. 8, 2008

(65) Prior Publication Data

US 2008/0211991 A1    Sep. 4, 2008

Related U.S. Application Data

(60) Provisional application No. 60/888,974, filed on Feb. 9, 2007.

(51) Int. Cl.
 *F21V 7/08*     (2006.01)
 *G02F 1/13357*  (2006.01)
 *G02B 27/30*    (2006.01)

(52) U.S. Cl. .......... 362/241; 362/97.2; 362/217.07; 349/67; 359/641

(58) Field of Classification Search .......... 349/62, 349/65, 67; 362/27, 247, 327, 346, 347, 362/614, 626, 97.2, 217.07, 241; 359/641, 359/850, 834, 851
See application file for complete search history.

(56) References Cited

U.S. PATENT DOCUMENTS

| | | | |
|---|---|---|---|
| 2,705,903 A | 4/1955 | Marshall | |
| 3,840,695 A | 10/1974 | Fischer | |
| 4,088,400 A | 5/1978 | Assouline et al. | |
| 4,171,874 A | 10/1979 | Bigelow et al. | |
| 4,183,630 A | 1/1980 | Funada et al. | |
| 4,660,936 A | 4/1987 | Nosker | |
| 4,704,004 A | 11/1987 | Nosker | |
| 4,915,479 A | 4/1990 | Clarke | |
| 5,629,784 A | 5/1997 | Abileah et al. | |
| 6,002,829 A | 12/1999 | Winston et al. | |
| 6,639,638 B1 | 10/2003 | Kodnani et al. | |
| 6,671,452 B2 | 12/2003 | Winston et al. | |
| 6,788,460 B2 | 9/2004 | Knox et al. | |
| 6,816,306 B2 | 11/2004 | Freese et al. | |
| 6,829,087 B2 | 12/2004 | Freese et al. | |
| 6,967,779 B2 | 11/2005 | Fadel et al. | |

(Continued)

FOREIGN PATENT DOCUMENTS

EP     0 302 787 A1    2/1989

(Continued)

OTHER PUBLICATIONS

International Search Report and Written Opinion (18 pages) corresponding to International Application No. PCT/US2008/001733; Mailing Date: Nov. 3, 2008.

(Continued)

*Primary Examiner* — David Nelms
*Assistant Examiner* — Tai Duong
(74) *Attorney, Agent, or Firm* — Myers Bigel Sibley & Sajovec, P.A.

(57) ABSTRACT

An LCD can include a Compact Collimating Reflector (CCR), is configured to be located downstream in a light path from an LCD light source, where the CCR is configured to reflect light from the LCD light source to provide collimated light downstream from the CCR. A light diffusion film is located downstream from the CCR and is configured to receive the collimated light from the CCR. An LCD panel is located downstream from the CCR.

14 Claims, 4 Drawing Sheets

U.S. PATENT DOCUMENTS

| | | | |
|---|---|---|---|
| 6,993,242 B2 | 1/2006 | Winston et al. | |
| 7,092,166 B1 | 8/2006 | Wood | |
| 7,530,712 B2 * | 5/2009 | Lin et al. | 362/247 |
| 2002/0044356 A1 | 4/2002 | Arakawa et al. | |
| 2003/0021044 A1 * | 1/2003 | Dragovan | 359/847 |
| 2003/0206342 A1 | 11/2003 | Reed et al. | |
| 2004/0114343 A1 | 6/2004 | Ho | |
| 2004/0188875 A1 | 9/2004 | Knox et al. | |
| 2005/0058947 A1 | 3/2005 | Rhinehart et al. | |
| 2005/0058948 A1 | 3/2005 | Freese et al. | |
| 2005/0058949 A1 | 3/2005 | Wood et al. | |
| 2006/0061869 A1 | 3/2006 | Fadel et al. | |
| 2006/0164729 A1 | 7/2006 | Wood | |
| 2006/0275714 A1 | 12/2006 | Rhinehart et al. | |
| 2007/0003868 A1 | 1/2007 | Wood et al. | |
| 2007/0014004 A1 | 1/2007 | Wood | |

FOREIGN PATENT DOCUMENTS

| | | |
|---|---|---|
| EP | 0302787 A1 | 2/1989 |
| EP | 0 528 645 A2 | 2/1993 |
| EP | 0 528 645 A3 | 2/1993 |
| EP | 0 881 427 A1 | 12/1998 |
| JP | 2003-272426 A | 9/2003 |

OTHER PUBLICATIONS

Tai et al., "Flat Collimator: A Backlighting Assembly Utilizing Microprisms For High Energy Efficiency", SID International Symposium Digest of Applications Papers, San Jose (Jun. 1994), vol. 25, pp. 10-13; XP-000492839.

U.S. Appl. No. 11/364,423, filed Feb. 28, 2006, Wood.
U.S. Appl. No. 11/113,846, filed Apr. 25, 2005, Wood.
U.S. Appl. No. 11/378,189, filed Mar. 17, 2006, Wood et al.
U.S. Appl. No. 11/382,163, filed May 8, 2006, Gardner et al.
U.S. Appl. No. 11/414,875, filed May 1, 2006, Wood.
U.S. Appl. No. 11/465,358, filed Aug. 17, 2006, Wood et al.
U.S. Appl. No. 11/538,910, filed Oct. 5, 2006, Gardner.
U.S. Appl. No. 11/580,480, filed Oct. 13, 2006, Wood.

Tai et al., "Flat Collimator: A Backlighting Assembly Utilizing Microprisms For High Energy Efficiency", SID International Symposium Digest of Application Papers, vol. 25, Jun. 14, 1994, pp. 10-13.

International Search Authority Invitation To Pay Additional Fees for PCT Application PCT/US2008/001733 mailed Jun. 20, 2008.

* cited by examiner

- A Gaussian curvature of zero at every point on the surface
- A segment selected from any degenerate form of a quadratic surface.

CURVED COMPACT COLLIMATING REFLECTORS

CROSS-REFERENCE TO RELATED APPLICATION

This Application claims priority to U.S. Provisional Patent Application No. 60/888,974, filed: Feb. 9, 2007, entitled "High Contrast Liquid Crystal Displays," the entire content of which is incorporated herein by reference.

FIELD OF THE INVENTION

The present invention relates to microstructures in general and, more particularly, to displays including microstructures.

BACKGROUND

Liquid crystal displays (LCDs) have become ubiquitous in all manner of electronic gear ranging from wristwatches to large-screen televisions. First introduced in the early 1970's, LCDs have become a low cost commodity for providing high resolution, full color displays. LCDs now excel in resolution, brightness, compactness, and cost. However, in spite of nearly forty years of development, LCDs may be inadequate with respect to daylight readability and off-axis contrast and color rendition. In particular, off-axis contrast and color rendition have received a great deal of attention as display size has grown. With small displays intended for personal use, such as cell phones, calculators, and wrist-watches, off-axis contrast may not be a major issue. Larger format displays, however, may be less forgiving than the above smaller displays.

Early developers of LCD devices employed back lights to generate nearly collimated light, diffusing the light toward the viewer downstream of the Liquid Crystal (LC) panel. Since the LC panel deals only with on-axis light, there may be less loss of contrast or color rendition as the viewer moves off-axis. Light supplied to the backside of the LCD panel transits the panel in the "on-pixels" and is blocked by the "off-pixels" creating an image viewable on the front side. Light supplied in a collimated fashion may utilize a separate diffuser placed between the LCD panel and the viewer to spread the light into a viewing space.

In spite of this early demonstration of LCD technology for televisions, for the remainder of the $20^{th}$ century LCD displays appeared in many small devices intended for personal use. In these applications, more emphasis was placed on compactness than on view angle performance. Back lighting solutions were adopted to provide high efficiency for mobile applications and to make the back light as thin and light as possible. Since thin back lights generally cannot accommodate conventional collimating optics, display makers generally adopted uncollimated backlights where light is emitted in a Lambertian pattern. Power consumption and portability generally won out over high viewing angle performance.

LCD panels have been included in devices aimed at the high-definition TV (HDTV) market. As this trend evolved, set makers continued to employ uncollimated back lights. Some TV manufacturers addressed the off-axis contrast and color problem by using compensation films and LCD cell architectures such as vertical alignment and in-plane switching. These approaches have helped improve viewability of modern LCD displays, but may entail certain trade-offs in complexity and/or cost. Higher end consumer LCD HDTVs employ much more sophisticated LC cell technology and polarization management layers than earlier generation devices based on twisted-nematic (TN) design, and generally have much higher cost.

The advent of HDTV has imposed some new requirements on the TV, namely its ability to provide high resolution images of 1 megapixels (720 p) and 2 megapixels (1080 p), and at large diagonals (e.g., 50"). A panel including full color pixels about 300-500 μm in size may utilize subpixels in the range of 100 μm.

SUMMARY

Embodiments according to the invention can provide high contrast liquid crystal displays (LCD). Pursuant to these embodiments, an LCD can include a Compact Collimating Reflector (CCR), configured to be located downstream in a light path from an LCD light source, where the CCR is configured to reflect light from the LCD light source to provide collimated light downstream from the CCR. A light diffusion film is located downstream from the CCR and is configured to receive the collimated light from the CCR. An LCD panel is located downstream from the CCR.

LCDs according to some embodiments of the present invention may provide substantially improved off-axis viewing performance, using less costly "older generation" LCD cell technology coupled with a collimated backlight and/or a diffuser film. These embodiments may arise from recognition that an LCD panel that can provide acceptable off-axis contrast and color rendition at lower cost may be provided through updated versions of earlier technical approaches, namely, use of collimated backlights combined with light diffusion layers downstream of the LCD panel.

DESCRIPTION OF EMBODIMENTS ACCORDING TO THE INVENTION

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. In the drawings, the thickness of layers and regions may be exaggerated for clarity. Like numbers refer to like elements throughout. As used herein the term "and/or" includes any and all combinations of one or more of the associated listed items and may be abbreviated as "/".

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "having," "having," "includes," and/or "including" when used in this specification, specify the presence of stated features, regions, steps, operations, elements, and/or components, but do not preclude the presence or addition of one or more other features, regions, steps, operations, elements, components, and/or groups thereof.

It will be understood that when an element such as a layer or region is referred to as being "on" or extending "onto" another element (or variations thereof), it can be directly on or extend directly onto the other element or intervening elements may also be present. In contrast, when an element is referred to as being "directly on" or extending "directly onto" another element (or variations thereof), there are no intervening elements present. It will also be understood that when an element is referred to as being "connected" or "coupled" to another element (or variations thereof), it can be directly connected or coupled to the other element or intervening elements may be present. In contrast, when an element is referred to as being "directly connected" or "directly coupled" to another element (or variations thereof), there are no intervening elements present. Finally, when an element is referred to as "holding" another element (or variations thereof), it can directly hold the other element or intervening elements may be present. In contrast, when an element is referred to as "directly holding" another element (or variations thereof), there are no intervening elements present.

It will be understood that, although the terms first, second, etc. may be used herein to describe various elements, components, regions, layers and/or sections, these elements, materials, regions, layers and/or sections should not be limited by these terms. These terms are only used to distinguish one element, material, region, layer or section from another element, material, region, layer or section. Thus, a first element, material, region, layer or section discussed below could be termed a second element, material, region, layer or section without departing from the teachings of the present invention. Moreover, the terms "front" and "back" may be used herein to describe opposing outward faces of a display screen, Conventionally, the viewing face may be deemed the front, but the viewing face may also be deemed the back, depending on orientation.

Embodiments of the present invention are described herein with reference to cross section and perspective illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated, typically, may be rounded. Thus, the regions illustrated in the figures are schematic in nature and their shapes are not intended to illustrate the precise shape of a region and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. Finally, the functionality of one or more blocks of the figures may be separated and/or combined with that of other blocks.

Some embodiments of the invention can provide a Liquid Crystal Display (LCD), sometimes referred to herein as an LCD display, configuration having substantially improved off-axis viewing performance, using less costly "older generation" LCD cell technology coupled with a collimated backlight and/or a diffuser film. These embodiments may arise from recognition that an LCD display panel that can provide acceptable off-axis contrast and color rendition at lower cost may be provided through updated versions of earlier technical approaches, namely, use of collimated backlights combined with light diffusion layers downstream of the LC panel as noted above. For HDTV, efficiency and compactness may not be as high a priority as they are in legacy LCD applications such as laptop computers and cell phones. Therefore, it may be commercially acceptable to once again consider TV designs using updated versions of the basic approaches outlined in the 1970's.

It will be understood that, as used herein, the term "downstream" can be used to indicate the relative position of an element within a light path. For example, when a first element is described as positioned downstream in the light path relative to a second element, the light transmitted along the light path impacts the second element before the first element. Conversely, as used herein, the term "upstream" can also be used to indicate the relative position of the element within the light path. In the example given above, the second element can be described as being upstream from the first element. Further, the light path is defined as an portion of the path that light provided by a source follows through the display to a location used to view the display.

Other embodiments of this invention can provide a light diffusion film having properties suitable for diffusion of light in an LCD display illuminated with collimated light, with said film also providing good image resolution and viewing angles.

Yet other embodiments of this invention can provide a light diffusion film suitable for light diffusion in an LCD display wherein said film is smooth and planar on both surfaces.

Still other embodiments of this invention can provide a light diffusion film suitable for light diffusion in an LCD display that has improved ambient light control.

Yet other embodiments of this invention can provide a compact light collimation device suitable for delivering substantially collimated light to an LCD display.

Still other embodiments of this invention can provide an optical film for use in a compact light collimation device.

Figure 1:
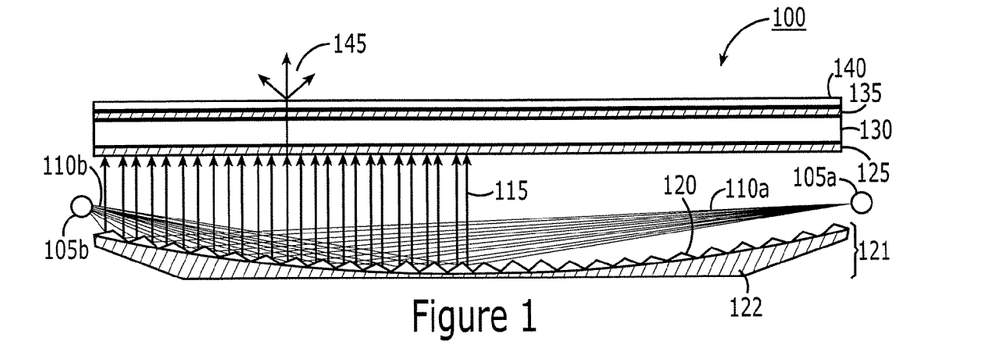
FIGS. 1 and 2 are cross sectional schematic simplified representations of a liquid crystal display including a compact collimating reflector and light diffusion film in some embodiments according to the invention.

As shown in FIG. 1, in some embodiments of this invention, a Liquid Crystal Display (LCD) 100 is provided whereby a Liquid Crystal (LC) panel 130 is illuminated on its rearward (or upstream) surface by substantially collimated light 115, which is polarized by a first polarizer 125. The LC panel 130 may be configured to pass the light image-wise (downstream) toward a viewer through a second polarizer 135 located on the downstream surface of the panel 130. It will be understood that the first and second polarizers 125 and 135 are crossed relative to one another to provide a cross-polarization effect. The frontward facing surface of the LC panel 130 is covered by the second polarizer 135 and a planar light diffusion film 140 in some embodiments according to the invention.

Figure 2:
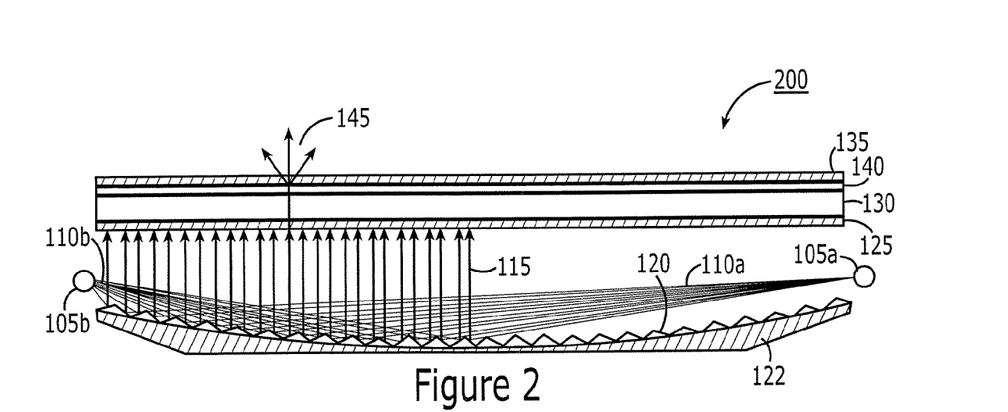

It will be understood that FIGS. 1 and 2 have been simplified for ease of understanding by illustrating only a portion (i.e. the left hand portion) of the light provided by the light sources and, therefore, reflected toward the viewer. Accordingly, in embodiments according to the invention, the light from the sources, and provided to the viewer, would be provided on both the right and left halves of the LCD shown in FIGS. 1 and 2.

The light diffusion film 140 is configured to produce a light distribution 145 configured for a particular display application. For example, in some embodiments according to the invention, the light diffusion film 140 is configured to produce a broad light distribution in the horizontal viewing direction and relatively narrower light distribution in the vertical viewing direction in the case of an HDTV display. See also, for example, FIGS. 3, 4, 5, 6, 7 and 8, illustrating light diffusion films in some embodiments according to the invention. The light diffusion film in these embodiments can be planar on both rearward and frontward surfaces, and may be adhesively attached to the polarizer layer. The light diffusion film may also have antireflection layers and/or antiglare and/or surface hardening layers on its frontward facing surface.

As further shown in FIG. 1, LCD 100 can include a Compact Collimating Reflector (CCR) 121, including a curved substrate 122 and an array of ridges 120 having opposing facets thereon. The CCR 121 is configured to receive light from LCD light sources 105a/b located at opposing ends of the CCR 121. The light sources 105a/b are configured to direct light 100a/b downstream toward the opposing facets of the ridges 120. In particular, respective opposing facets on the ridges 120 face the respective opposing light sources 105a/b. For example, the facets on each of the ridges 120 that face the light source 105a reflect light 110a downstream toward the LC Panel 130 whereas the facets on each of the ridges that face the light source 105b reflect light 110b downstream toward the LC Panel 130. Accordingly, the light provided by the CCR 121 downstream toward the panel 130 is collimated light 115.

As shown in FIG. 2, in some embodiments according to the invention, the LC panel 130 is illuminated on the rearward (upstream) surface by the collimated light 115 (having been polarized by the first polarizer 125) and the LC panel 130 operates to pass some of the collimated light 115 image-wise downstream toward the viewer. The frontward facing (downstream) surface of the LC panel 130 is covered with the planar light diffusion film 140, which is sandwiched between the second polarizer 135 and the outer surface of the LC panel 130. As described above, the light diffusion film 140 can be configured to provide a light distribution that is broad in the horizontal direction and narrower in the vertical direction. The light diffusion film 140 can be planar on both the rearward and frontward surfaces, and may be adhesively attached to both the LC panel and the polarizer layer.

In some embodiments of this invention, the light diffusion films can be configured to provide controlled light diffusion properties and can be substantially planar on both rearward and frontward facing surfaces. These films can provide light diffusion properties without necessarily relying on scattering or refraction at an air interface, and thereby reduce reflective losses. In some embodiments according to the invention, light diffusion films can include an array of microstructures made using a transparent material having a first index of refraction, embedded within a second transparent material having a second index of refraction. The difference in refractive indices between the first and second materials may be from about 0.02 to about 0.3 and may depend upon the shape of the microstructure, the material used to make the microstructure, and/or the degree of light diffusion desired. See, for example, FIGS. 3, 4, 5, 6, 7 and 8, illustrating the configuration of light diffusion films in some embodiments according the invention.

Figure 3:
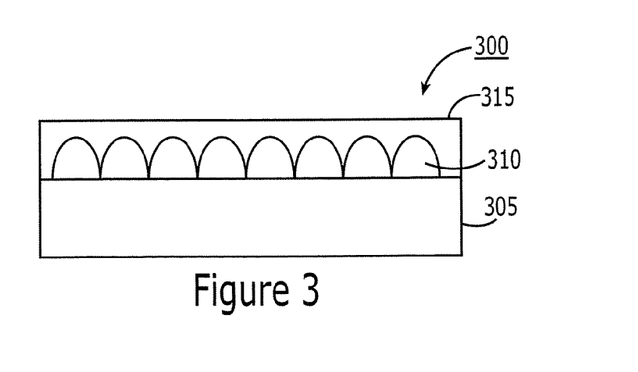
FIG. 3 is a cross sectional schematic representation of a light diffusion film including microstructures embedded in a transparent layer in some embodiments according to the invention.

FIG. 3 is a cross-sectional schematic representation of a light diffusion film 300 including a transparent substrate 305 with microstructures 310 thereon embedded in a transparent material 315 each having different refractive indices in some embodiments according to the invention. The microstructures 310 used in some embodiments may be lens-shaped, prisms, ridges, facets and/or randomly shaped convex or concave structures having physical size from about 1 μm up to about 100 μm in width, length and/or height. The microstructures 310 may be configured such that, when embedded within the transparent material 315 having a differing refractive index, they will produce a specific light diffusion pattern useful for the display. Such a light diffusion pattern may have differing horizontal and vertical viewing angles. More specifically, the microstructures may produce a horizontal light distribution that is broader than the vertical light distribution.

Microstructures 310 used in some embodiments may be produced, for example, by microreplication using UV curable photopolymer, as previously described in U.S. Patent Application Nos. 2007/0014004; 2007/0003868; 2006/0275714; 2006/0164729; 2006/0061869; 2005/0058947; 2005/0058948; 2005/0058949; 2004/0188875; 2003/00206342 and/or 2006/0164729; and/or U.S. Pat. Nos. 6,788,460, 6,967,779; 6,829,087, 6,816,306 and/or 7,092,166; and/or U.S. application Ser. Nos. 11/113,846; 11/364,423; 11/378,189; 11/382,163; 11/414,875; 11/465,358; 11/538,910 and/or 11/580,480. Microstructures may be microreplicated on the surface of a transparent substrate such as polyester, polycarbonate, acrylic film, triacetate cellulose, etc. The transparent substrate 305 may include a separate layer on the opposite surface for adhesively attaching the substrate to the LC panel or frontward polarizer film in an LCD display.

As described above, the microstructures 305 may be embedded in the transparent material 315 having a second index of refraction. The transparent material 315 may be applied by overcoating the microstructure layer with a liquid layer followed by curing, for example with UV light or heat. The transparent material 315 may be temporarily sandwiched between the microstructure layer and a planar cover layer during the curing step to provide a planar outer surface. The planar cover layer may be removed once the transparent material 315 is cured.

Figure 4:
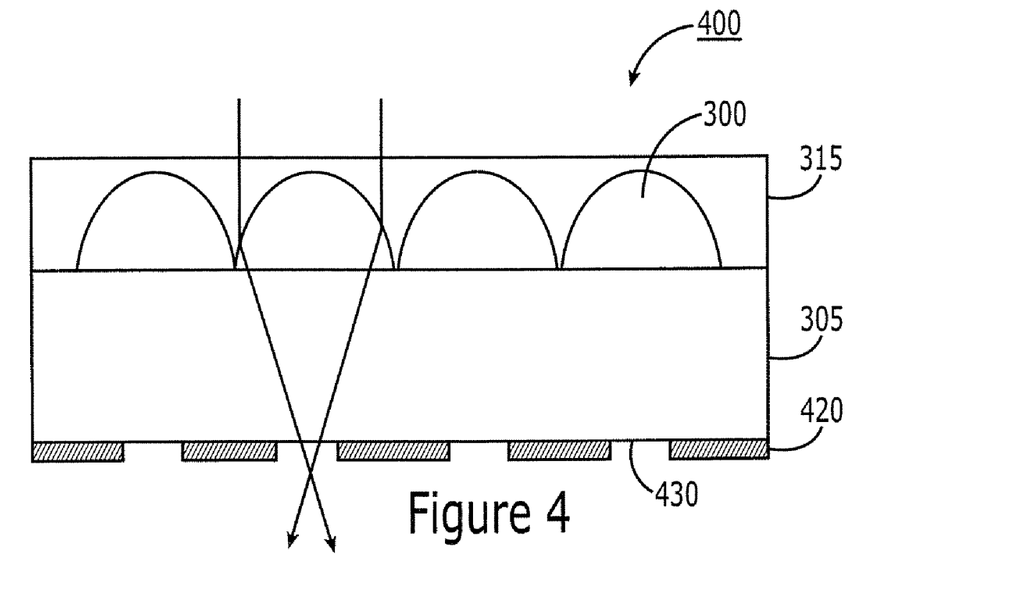
FIG. 4 is a cross sectional schematic representation of a light diffusion film including convex microstructures and a light absorbing layer with apertures therein in some embodiments according to the invention.

In some embodiments according to the invention, the embedded microstructures 310 included in a frontward light diffusion film 400 may be coupled with apertures 430 in a light absorbing layer 420 that may be an integral within the light diffusion film 400, as shown in, for example, FIG. 4. The light absorbing layer 420 in these embodiments may be designed to improve the ambient light rejection capabilities of the LCD and may further improve the black appearance of such a display. Improving both ambient light rejection and black appearance may improve the contrast of the image of the LCD. The apertures 430 in the light absorbing layer 420 may be configured such that most of the microstructures (sometimes referred to herein as microlenses) in the light diffusion film 400 are associated with respective ones of the apertures 430 within the light absorbing layer 420. In some embodiments the aperture 430 may be substantially centered on the optical axis of the respective microlens in the array 310, and separated from the microlens such that the aperture 430 is near the focal plane of the microlens, and light arriving on the microlens is efficiently transmitted through the respective aperture 430.

Still referring to FIG. 4, in some embodiments according to the invention, the microstructures 310, coupled with apertures 430, may constitute a convex surface of a first refractive index material embedded in the planar layer 315 having a second refractive index wherein the first refractive index is higher than the second refractive index.

Apertures in the light absorbing layer may be provided in some embodiments by, for example, laser exposure of the light absorbing layer through the microlens as described in the above-cited U.S. patents and patent applications. The light absorbing layer may be, for example, a thin layer of black ink deposited on one side of a transparent substrate, as described in the above-cited U.S. patents and patent applications. Apertures provided according to some embodiments of this invention may have a size measured in area ranging from about 5% to about 60% of the size of their corresponding microlens. Apertures may be in the form of continuous slits or discrete holes, or some combination thereof. In some embodiments, the microlens shape and size, substrate thickness, aperture size and placement is designed to enhance or maximize the transmission of light transiting the microlens/aperture pair toward the viewing space. In some embodiments, the apertures may be created in areas that are not coincident with the optical axis of their corresponding microlens. In other embodiments there may be multiple discrete apertures or slits for each microlens. In some embodiments a substrate having microlenses on a rearward facing surface of a transparent substrate and apertures in a light absorbing layer on the opposing frontward facing surface may be adhesively attached to an LC panel or to a polarizer film attached to an LC panel to provide a display having separately defined horizontal and vertical viewing angles.

Figure 5:
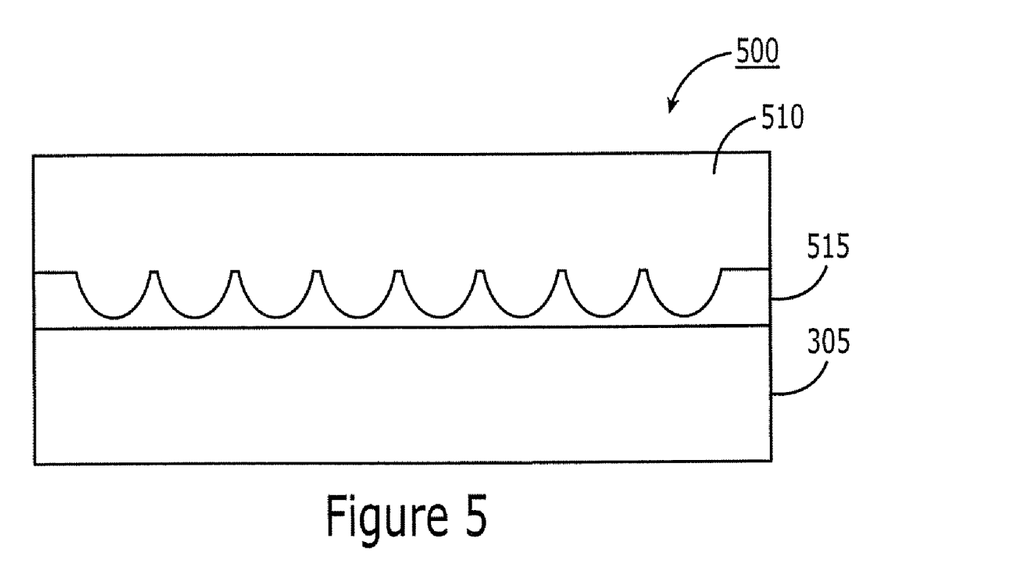
FIG. 5 is a cross sectional schematic representation of a light diffusion film including concave microstructures embedded in a transparent layer in some embodiments according to the invention.

Referring to FIG. 5, in some embodiments according to the invention, the microstructures 515 may include a concave surface of a first refractive index material embedded in a planar transparent layer 510 having a second refractive index wherein the first refractive index is lower than the second refractive index.

Figure 6:
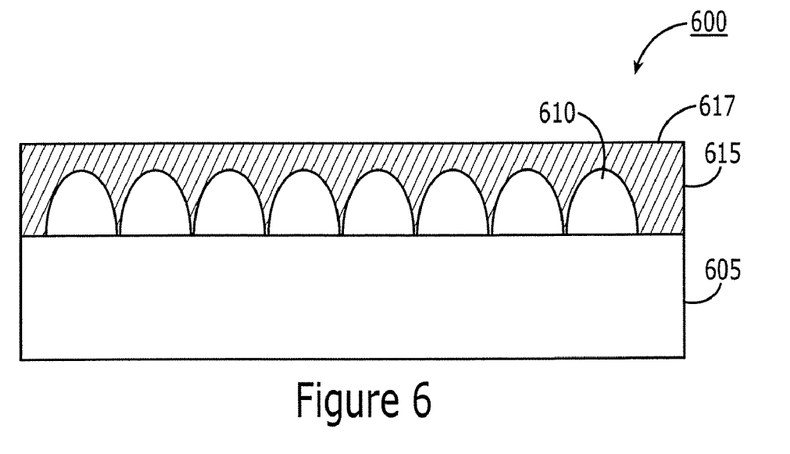
FIG. 6 is a cross sectional schematic representation of a light diffusion film including convex microstructures embedded in a transparent layer having diffusive materials included therein in some embodiments according to the invention.

Referring to FIG. 6, in some embodiments according to the invention, a diffusive material 617 may be added to a light diffusion film 600 to further enhance diffusive properties. In some embodiments according to the invention, the diffusive material 617 may be a solid particulate material such as glass, silica, and/or alumina. The diffusive material 617 may be added directly to the material used to produce the transparent layer 615 in which microstructures 610 are embedded.

Figure 7:
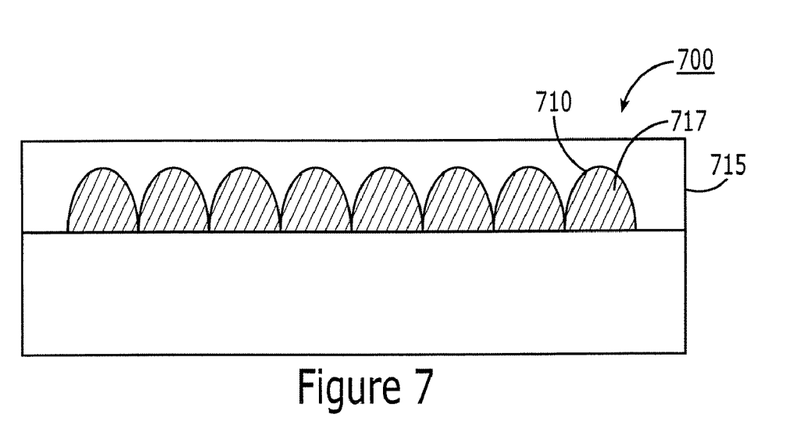
FIG. 7 is a cross sectional schematic representation of a light diffusion film including convex microstructures including a diffusive material within, and embedded in a transparent layer in some embodiments according to the invention.

Referring to FIG. 7, in some embodiments according to the invention, a diffusive material 717 may be added to a light diffusion film 700 to further enhance diffusive properties. In some embodiments according to the invention, the diffusive material 717 may be a solid particulate material such as glass, silica, and/or alumina. The diffusive materials may be added directly to the materials used to produce the microstructures 710, which are embedded in a transparent layer 715.

In some embodiments according to the invention, colorants in the form of dyes and/or pigments may be embedded and/or dissolved within the light diffusion film described herein for the purpose of modifying the spectral transmissive properties of the film.

Figure 8:
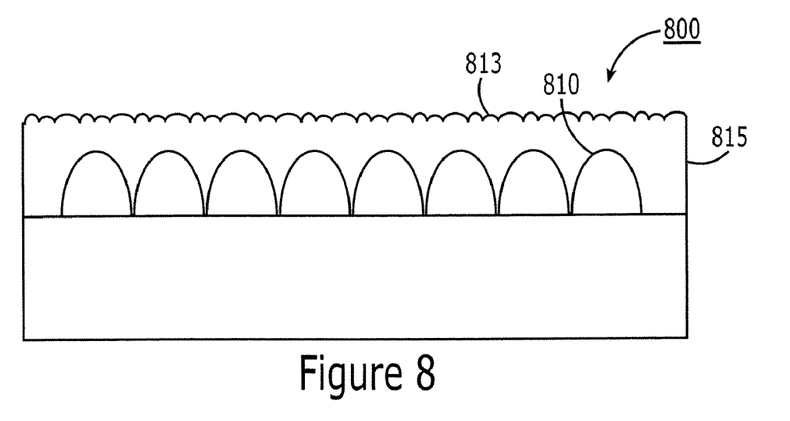
FIG. 8 is a cross sectional schematic representation of a light diffusion film including convex microstructures embedded in a transparent layer having a textured outer surface in some embodiments according to the invention.

Referring to FIG. 8, in some embodiments of this invention, microstructures 810 may be embedded in a transparent layer 815 having a second index of refraction. The transparent layer 815 may be applied by overcoating the microstructure 810 layer with a liquid layer followed by curing, for example with UV light or heat. In some embodiments according to the invention, the transparent medium 815 may itself be embossed or imprinted with a microstructure or texture 813 in order to provide an antiglare property in the frontward facing surface. This imprinting may be accomplished, for example, using UV replication of a stamper as described in the above-cited U.S. patents and patent applications.

Figure 9:
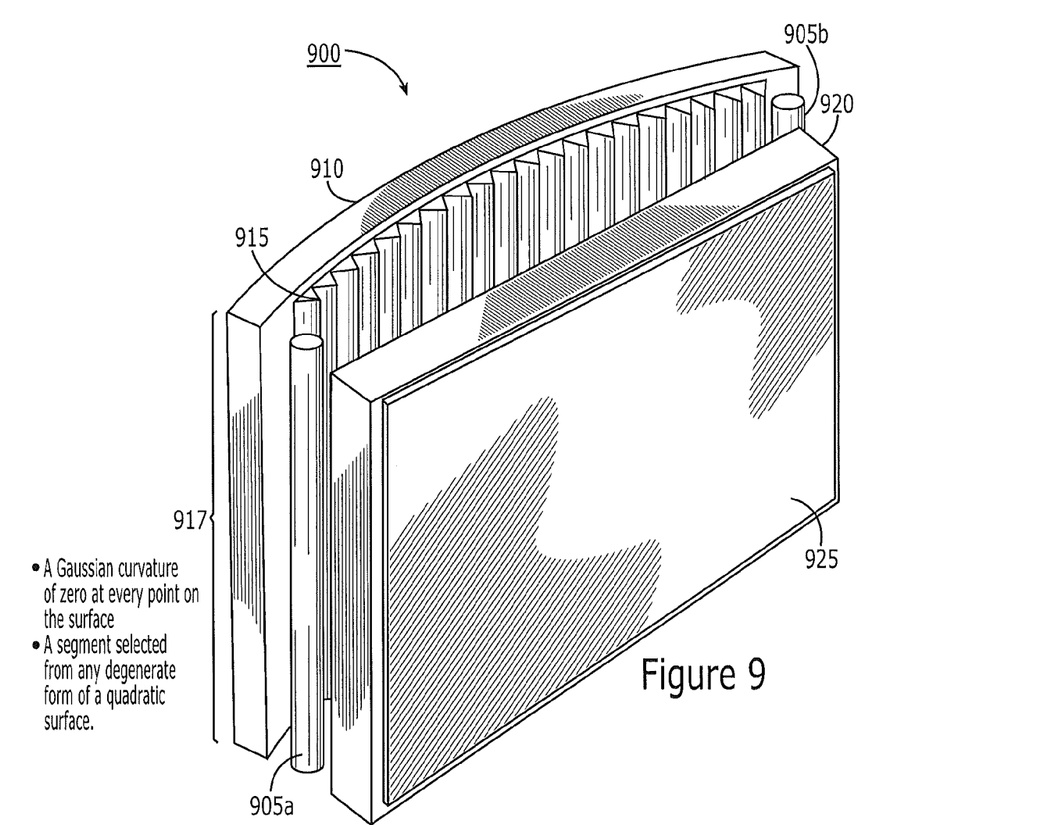
FIG. 9 is a perspective view of a liquid crystal display (LCD) including a compact collimating reflector (CCR) with a curved substrate having ridges formed thereon with opposing facets facing respective LCD light sources positioned at opposing ends of the CCR in some embodiments according to the invention.

FIG. 9 is a perspective schematic representation of an LCD HDTV 900 including a Compact Collimating Reflector (CCR) 917 with LCD light sources 905a/b in some embodiments according to the invention. The CCR 917 can be particularly suited as a backlight wherein the TV 900 also includes a frontward facing light diffusion film 925 on an LCD panel 920. The LCD light sources 905a/b may be light emitting devices such as fluorescent tubes, LED arrays, or other suitable light sources known in the art. The CCR 917 may also be utilized with a reflective back surface containing individual facets on ridges 915 configured to reflect light, collimated in at least one plane, from the light sources 905a/b downstream through the LCD panel 920 and film 925 toward a viewer.

The reflective facets may be metallized microstructures replicated on the surface of a suitable substrate 910. The reflective facets may have a shape designed to reflect light from a respective one of the LCD light sources 905a/b toward the LCD panel 920 in such a manner that the light is collimated in the horizontal plane. The metallized microstructures may be formed on the surface of a flexible substrate which is in turn attached to a rigid, curved backing surface chosen such that the reflective facets most efficiently intersect light from the LCD light sources 905a/b and to make the backlight compact while providing the desired collimation. In some embodiments according to the invention, the metallized microstructures and the curved backing provide the CCR 917.

In some embodiments according to the invention, the LCD light sources 905a/b may be fluorescent tubes such as cold-cathode fluorescent lamps (CCFL). Two such tubes may be used for illumination of an LCD HDTV panel 920 by orienting these tubes vertically along the narrow edges of the CCR 917. The tubes may be selected to provide sufficient brightness for the LCD HDTV 900. The tubes may be fixtured in a reflective housing such as a parabolic trough such that the light emitted by the tubes is confined to a range of angles subtended by the array of reflective facets on the CCR 917.

In some embodiments according to the invention, the LCD light sources 905a/b may be arrays of light emitting diodes (LEDs) arrayed in a linear array, with one such array along each narrow edge of the CCR 917. LEDs may be white LEDs or individual red, green, and blue LEDs chosen to provide sufficient color gamut for an HDTV image. The LEDs may be coupled with a reflective housing to efficiently confine emitted light into a range of angles subtended by the array of reflective facets on the CCR 917.

In some embodiments according to the invention, the LCD light sources 905a/b may be CCFL lamps or linear LED arrays oriented vertically and substantially parallel to the narrow edges of the CCR 917. The first LCD light source 905 may be located along a first narrow edge of the CCR 917, while the second LCD light source 905 may be located along a second narrow edge of the CCR 917. In this configuration, the illumination may be collimated upon reflection from the CCR 917 in a horizontal direction and thereby provide improved illumination for the LCD TV 900 having the frontward facing light diffusion film 925 according to some embodiments of this invention.

In alternative embodiments according to the present invention, the LCD light sources 905 may be emitters such as CCFL lamps or linear LED arrays oriented horizontally and substantially parallel to the long edges of the CCR 917. The first LCD light source 905 may be located along a first long edge of the CCR 917, while the second LCD light source 905 may be located along a second long edge of the CCR 917. In these alternative embodiments, the illumination thus produced may be substantially collimated upon reflection from the CCR in a vertical direction and uncollimated in a horizontal direction, thereby providing improved or ideal illumination for a conventional high viewing angle LCD panel 920.

Figure 10:
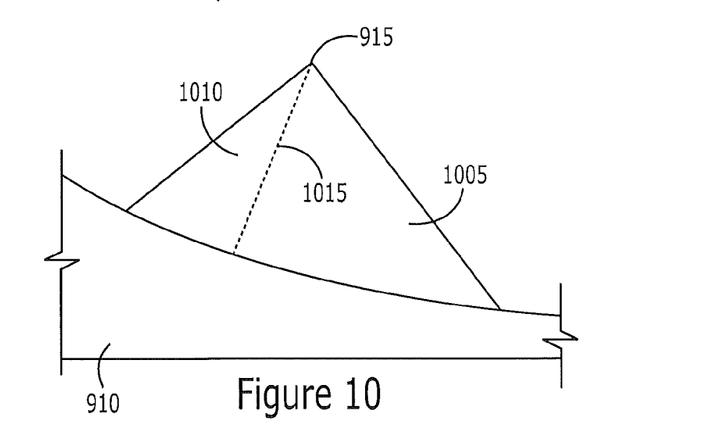
FIG. 10 is a cross sectional schematic representation of a portion of a ridge included on the CCR shown in FIG. 9 illustrating opposing facets in some embodiments according to the invention.

FIG. 10 is a cross-sectional schematic representation of ridges 915 shown in FIG. 9 in some embodiments according to the invention. According to FIG. 10, the ridges 915 are on the substrate 910, which may be curved. The ridges 915 can include first and second reflective facets 1005/1010 on opposing faces of the ridges 915. In particular, the facets 1005/1010 face in opposite directions, each facing one of the LCD light sources 905a/b located at a respective opposing edge of the CCR 917.

In some embodiments according to the invention, the facets 1005/1010 may be formed as part of a triangular-shape ridge on the substrate 910. The first facet 1005 can have a first face defining a first base angle with the substrate 915, wherein this face is configured to reflect light arriving from the first LCD light source 905a such that reflected light is oriented perpendicular to the LCD panel 920 in at least one plane of incidence. The second facet 1010 of the ridge 915 provides a second face, opposing the first face, that defines a second base angle with the substrate 910, wherein this second face is configured to reflect light from the second LCD light source 905b such that the reflected light is oriented perpendicular to the LCD panel 920 in the at least one plane of incidence. The first and second base angles, as well as a height 1015 and pitch of the triangular-shape ridge, may vary from one ridge to the next along the array of ridges 915. The long axis of each ridge 915 may by perpendicular to the direction of collimation of light.

The triangular-shape ridges 915 on the surface of the CCR 917 may be formed using any conventional method including injection molding, embossing, or microreplication with a UV curable resin. The triangular-shape ridges 917 may be formed on the surface of the substrate 910. In some embodiments according to the invention, the substrate 910 may be a flexible sheet such as a plastic film made from, for example, polyester or polycarbonate resin. In other embodiments according to the invention, the substrate 910 may be a rigid panel such as an acrylic or aluminum panel. Triangular-shape ridges 915 may be coated with a reflective material such as a thin metallic layer. In some embodiments according to the invention, the reflective metallic layer is a layer of aluminum metal having a thickness greater than about 100 nm. The metallic layer may be deposited on an array of triangular-shape ridges 915 using conventional methods such as evaporation or sputtering. The reflectivity of the reflective metal layer may be further enhanced using conventional methods such as the deposition of so-called "Bragg" reflective layers. The durability of the metallic reflective layer may be further enhanced by the deposition of conventional "protection" layers such as a thin layer of silicon dioxide or silicon nitride.

In some embodiments, the reflective triangular-shape ridges 915 are arrayed on the surface of the CCR 917 with their major axes perpendicular to the plane of collimation, wherein the surface of this array is a curved surface. More particularly, this curved surface may be configured such that the surface resembles a segment of the curved wall of a cylinder. In general the curved surface may be a surface wherein the Gaussian curvature of the surface is zero at every point on the surface, and the curvature of the surface is defined along a direction that is parallel to the plane of collimation. In some embodiments according to the invention, the surface may constitute a segment selected from any degenerate form of a quadric surface, such as an elliptical, circular, parabolic or hyperbolic cylinder.

In some embodiments according to the invention, the CCR 917 surface covered with the array of reflective triangular-shape ridges 915 may be a surface of a rigid material such as an acrylic panel, formed into the shape of a degenerate quadric surface wherein the curvature of the surface is defined along a direction parallel to the plane of collimation. In some embodiments according to the invention, the surface covered with the array of reflective triangular-shape ridges may be a surface of a flexible substrate such as a polyester film, wherein the film is attached to the surface of a rigid pre-form material having the desired degenerate quadric surface curvature. In some embodiments according to the invention, the reflective triangular-shape ridges 915 face the rearward surface of the LCD panel 920 and direct light from the LCD light sources 905a/b toward the panel 920 such that the reflected light is substantially collimated in at least one plane.

In some embodiments according to the invention, each point on the rearward surface of the LCD panel 920 will receive light originating from both the first and second LCD light sources, having traveled from the light sources 905a/b and reflected from at least a portion of a first and second opposing facets, respectively, of reflective triangle-shaped ridges 915 arrayed on the surface having degenerate quadric curvature. In some embodiments according to the invention, the geometry of the reflective triangle-shaped ridges 915, the curvature of the surface 910, and the placement of the light sources 905a/b is configured to provide illumination having uniformity sufficient for the LCD panel 920 to produce acceptable HDTV image quality.

The following Example shall be regarded as merely illustrative and shall not be construed as limiting the invention. In an example embodiment according to the invention, the LCD panel is about 28" wide and 16" in height. The panel is illuminated with two parallel CCFL tubes, one along each side of the panel, separated by about 32". The CCFL tubes are enclosed in conventional parabolically shaped trough reflectors with their openings aligned to direct light output toward the sagittal plane of the screen, and within an angular field subtended by a compact collimating reflector (CCR). The CCR shape is a spherically shaped trough curved in the horizontal direction. The CCR curvature is inscribed by an arc sector of a circle having a radius of 30" and a total sag (distance from the distal point of the arc to a chord drawn between the endpoints) of 4". The CCR surface is covered with an array of 94 triangular-shaped ridges coated with a thin layer of evaporated aluminum approximately 100 nm in thickness.

Each triangular-shaped ridge has a base width of 0.3", a first base angle, a second base angle, and a height as shown in Table 1 (due to bilateral symmetry, only half of the ridge shapes are shown in Table 1). The light output from the CCR source according to this example produces illumination that is substantially uniform and collimated in the horizontal plane, and uncollimated in the vertical plane. The light source of this example is suitable for backlighting an LCD panel equipped with a frontward facing light diffusion film according to this invention to produce an HDTV image with a 32" diagonal and an aspect ratio of 16:9.

The frontward facing light diffusion film of example 1 includes a polyester base film with a thickness of 50 μm. Microstructures consisting of microlenses having anamorphic shape with the slow optical axis oriented vertically and the fast optical axis oriented horizontally. The microstructures are fabricated via UV replication of a master shape as described in the above-cited U.S. patents and patent applications, using a transparent UV photopolymer having a refractive index of 1.55. The microstructures are embedded in a second layer of a transparent photopolymer having a refractive index of 1.47. The second layer is applied via gravure roll coating and planarized with a transparent polyester coversheet. The second layer is cured with UV light through the cover sheet. The cover sheet is then removed. The finished light diffusion film is attached to the outer surface of a conventional twisted nematic (TN) LCD display using a conventional pressure sensitive adhesive layer, wherein the adhesive layer is affixed to the second photopolymer layer. The TN LCD display has a thin-film transistor (TFT) layer to produce image-wise transmission of light. The light diffusion film, combined with the semicollimated light from the CCR backlight and the TN LCD panel, produces a horizontal view angle with a half-brightness point of about 45° from the normal, and produces excellent color and contrast at any view angle.

TABLE 1

Geometry of Triangle-Shaped Ridges of Example 1

| +/−Distance from Centerline (inch) | First Base Angle (degrees) | Second Base Angle (degrees) | Ridge Height (inch) |
|---|---|---|---|
| 0.0 | 37.5 | 37.5 | 0.115 |
| 0.3 | 37.1 | 38.0 | 0.115 |
| 0.6 | 36.7 | 38.4 | 0.115 |
| 0.9 | 36.3 | 38.8 | 0.115 |
| 1.2 | 35.8 | 39.2 | 0.115 |
| 1.5 | 35.4 | 39.7 | 0.115 |
| 1.8 | 35.0 | 40.1 | 0.115 |
| 2.1 | 34.5 | 40.5 | 0.114 |
| 2.4 | 34.1 | 41.0 | 0.114 |
| 2.7 | 33.7 | 41.4 | 0.114 |
| 3.0 | 33.2 | 41.8 | 0.114 |
| 3.3 | 32.8 | 42.3 | 0.113 |
| 3.6 | 32.4 | 42.7 | 0.113 |
| 3.9 | 32.0 | 43.1 | 0.112 |
| 4.2 | 31.5 | 43.5 | 0.112 |
| 4.5 | 31.1 | 44.0 | 0.111 |
| 4.8 | 30.7 | 44.4 | 0.111 |
| 5.1 | 30.2 | 44.8 | 0.110 |
| 5.4 | 29.8 | 45.3 | 0.110 |
| 5.7 | 29.4 | 45.7 | 0.109 |
| 6.0 | 28.9 | 46.2 | 0.108 |
| 6.3 | 28.5 | 46.6 | 0.108 |
| 6.6 | 28.0 | 47.0 | 0.107 |
| 6.9 | 27.6 | 47.5 | 0.106 |
| 7.2 | 27.2 | 47.9 | 0.105 |
| 7.5 | 26.7 | 48.3 | 0.104 |
| 7.8 | 26.3 | 48.8 | 0.103 |
| 8.1 | 25.8 | 49.2 | 0.102 |
| 8.4 | 25.4 | 49.7 | 0.102 |
| 8.7 | 24.9 | 50.1 | 0.100 |
| 9.0 | 24.5 | 50.6 | 0.099 |
| 9.3 | 24.0 | 51.0 | 0.098 |
| 9.6 | 23.6 | 51.5 | 0.097 |
| 9.9 | 23.1 | 51.9 | 0.096 |
| 10.2 | 22.7 | 52.4 | 0.095 |
| 10.5 | 22.2 | 52.8 | 0.094 |
| 10.8 | 21.8 | 53.3 | 0.092 |
| 11.1 | 21.3 | 53.8 | 0.091 |
| 11.4 | 20.9 | 54.2 | 0.090 |
| 11.7 | 20.4 | 54.7 | 0.088 |
| 12.0 | 19.9 | 55.1 | 0.087 |
| 12.3 | 19.5 | 55.6 | 0.085 |
| 12.6 | 19.0 | 56.1 | 0.084 |
| 12.9 | 18.5 | 56.6 | 0.082 |
| 13.2 | 18.0 | 57.0 | 0.081 |
| 13.5 | 17.6 | 57.5 | 0.079 |
| 13.8 | 17.1 | 58.0 | 0.077 |

In the drawings and specification, there have been disclosed embodiments of the invention and, although specific terms are employed, they are used in a generic and descriptive sense only and not for purposes of limitation, the scope of the invention being set forth in the following claims.

What is claimed:

1. An optical element comprising:
   a curved Compact Collimating Reflector (CCR), the CCR including a plurality of ridges, wherein the ridges include first and second opposing facets defining respective angles relative to a base of a respective ridge, wherein the first opposing facet faces a first end of the CCR and the second opposing facet faces a second end of the CCR that is opposite the first end, wherein the first and second opposing facets on the respective ridge are configured to reflect light, incident from the first and second ends respectively, in a direction of collimation in which the CCR provides collimated light.

2. An optical element according to claim 1 further comprising:
   a first light source located at about a first end of the CCR and configured to emit first light downstream toward the first facet of the CCR; and
   a second light source located at about a second end of the CCR and configured to emit second light downstream toward the second facet of the CCR.

3. An optical element according to claim 1 wherein the plurality of ridges are located on a surface of the CCR to define a segment of a curved wall of a cylinder.

4. An optical element according to claim 3 wherein the surface is curved a direction that is parallel to the direction of the collimation.

5. An optical element according to claim 1 wherein a Gaussian curvature of a surface of the CCR is zero at every point on the surface.

6. An optical element according to claim 1 wherein a surface of the CCR comprises a segment defined by a degenerate form of a quadric surface.

7. An optical element comprising:
a curved Compact Collimating Reflector (CCR), the CCR including a plurality of ridges each including first and second opposing facets defining respective unequal oblique angles relative to a base of a respective ridge on which the respective first and second opposing facets are located, wherein the first opposing facet faces a first end of the CCR and the second opposing facet faces a second end of the CCR that is opposite the first end, wherein the first facets define progressively decreasing angles relative to the respective base as a distance from a centerline of the CCR increases and wherein the second facets define progressively increasing angles relative to the respective base as the distance from the centerline increases.

8. An optical element according to claim 7 wherein the base is defined by a line segment connecting bases of the first and second opposing facets.

9. An optical element according to claim 7 wherein a height of the respective ridge progressively decreases as the distance of the respective ridge from the centerline increases.

10. An optical element according to claim 7 wherein the first and second opposing facets are exposed to free space.

11. An optical element comprising:
a curved Compact Collimating Reflector (CCR) having a curvature that is inscribed by an arc sector of a circle to have a sag of about 4 inches, the CCR including a plurality of ridges each including first and second opposing facets defining respective unequal oblique angles relative to a base of a respective ridge.

12. An optical element according to claim 11 wherein the base is defined by a line segment connecting bases of the first and second opposing facets.

13. An optical element according to claim 11 wherein the first and second opposing facets are exposed to free space.

14. An optical element comprising:
a curved Compact Collimating Reflector (CCR), the CCR including a plurality of ridges each including first and second opposing facets wherein the first opposing facet is angled to receive first light from a first light source at a first end of the CCR, and to reflect the first light downstream from the CCR and wherein the second facet is angled to receive second light from a second light source at a second end of the CCR, opposite the first end, to reflect the second light downstream from the CCR, wherein the CCR has a curvature that is inscribed by a arc sector of a circle to have a sag of 4 inches.

* * * * *